(12) United States Patent
Kikuchi et al.

(10) Patent No.: US 9,712,084 B2
(45) Date of Patent: Jul. 18, 2017

(54) ELECTRIC POWER CONVERSION DEVICE

(71) Applicants: MITSUBISHI ELECTRIC CORPORATION, Chiyoda-ku (JP); TOSHIBA MITSUBISHI-ELECTRIC INDUSTRIAL SYSTEMS CORPORATION, Chuo-ku (JP)

(72) Inventors: Takeshi Kikuchi, Chiyoda-ku (JP); Kaho Mukunoki, Chiyoda-ku (JP); Toshiyuki Fujii, Chiyoda-ku (JP); Osamu Mori, Chiyoda-ku (JP); Shinzo Tamai, Chuo-ku (JP); Sadao Funahashi, Chuo-ku (JP); Yasuhiko Hosokawa, Chuo-ku (JP); Kotaro Higashi, Chuo-ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/109,688

(22) PCT Filed: Jul. 2, 2014

(86) PCT No.: PCT/JP2014/067644
§ 371 (c)(1),
(2) Date: Jul. 5, 2016

(87) PCT Pub. No.: WO2015/102060
PCT Pub. Date: Jul. 9, 2015

(65) Prior Publication Data
US 2016/0336874 A1  Nov. 17, 2016

(30) Foreign Application Priority Data

Jan. 6, 2014 (JP) ................................. 2014-000069

(51) Int. Cl.
*H02J 3/26* (2006.01)
*H02M 7/5387* (2007.01)
(Continued)

(52) U.S. Cl.
CPC ....... *H02M 7/53871* (2013.01); *H02M 7/483* (2013.01); *H02J 3/1857* (2013.01);
(Continued)

(58) Field of Classification Search
CPC ........ H02M 1/088; H02M 7/06; H02J 3/1857; H02J 3/26; Y02E 40/26; Y02E 40/50; G01R 29/18
(Continued)

(56) References Cited

U.S. PATENT DOCUMENTS 6,005,788 A * 12/1999 Lipo .................... H02M 7/49
363/71
9,590,483 B1 * 3/2017 Basic .................... H02J 3/1857
(Continued)

FOREIGN PATENT DOCUMENTS

EP        2 560 065 A1    2/2013
JP        2011-223784 A   11/2011

OTHER PUBLICATIONS

International Search Report issued Sep. 30, 2014 in PCT/JP2014/067644 filed Jul. 2, 2014.
(Continued)

*Primary Examiner* — Jue Zhang
*Assistant Examiner* — Jye-June Lee
(74) *Attorney, Agent, or Firm* — Oblon, McClelland, Maier & Neustadt, L.L.P.

(57) ABSTRACT

An electric power conversion device includes a power conversion unit and a converter control unit. The power conversion unit includes three arms connected to an AC circuit. The converter control unit includes a phase DC
(Continued)

voltage control unit, a negative sequence current command value calculation unit, an output current control unit, a circulating current control unit, a voltage command value calculation unit, and a gate signal generation unit, and imbalance of cell DC capacitor voltages among phases due to grid imbalance is controlled by circulating current and negative sequence current.

20 Claims, 16 Drawing Sheets

(51) Int. Cl.
  *H02M 7/483* (2007.01)
  *H02J 3/18* (2006.01)
  *H02M 1/00* (2006.01)
(52) U.S. Cl.
  CPC .............. *H02M 2001/0003* (2013.01); *H02M 2007/4835* (2013.01); *Y02E 40/26* (2013.01)
(58) Field of Classification Search
  USPC .......................... 363/39, 71, 97, 126; 307/14
  See application file for complete search history.

(56) References Cited

U.S. PATENT DOCUMENTS

| | | | | |
|---|---|---|---|---|
| 2012/0081939 A1* | 4/2012 | Hasler | .................. | H02J 3/1857 363/126 |
| 2012/0092906 A1* | 4/2012 | Hasler | .................. | H02J 3/1857 363/39 |
| 2013/0070495 A1* | 3/2013 | Jonsson | ................ | H02M 7/758 363/84 |
| 2014/0226373 A1* | 8/2014 | Park | ...................... | H02M 7/483 363/35 |
| 2015/0229234 A1* | 8/2015 | Park | ...................... | H02M 7/797 363/78 |
| 2015/0357937 A1* | 12/2015 | Takahara | .............. | H02M 7/217 363/97 |
| 2016/0056727 A1* | 2/2016 | Mukunoki | ............ | H02M 7/483 363/68 |
| 2016/0139643 A1* | 5/2016 | Hasler | ....................... | H02J 3/26 700/297 |

OTHER PUBLICATIONS

Extended European Search Report dated May 10, 2017 issued in the corresponding European Patent Application No. 14877401.1.
Sixing Du, et al., "A Novel DC Voltage Control Method for STATCOM Based on Hybrid Multilevel H-bridge Converter", Dec. 31, 2011 (Dec. 31, 2011), XP055366794, Retrieved from the Internet: URL: http://ieeexplore.ieee.org/ielx5/63/4359240/06193213.pdf [retrieved on Apr. 24, 2017], 12 Pages.
Sixing Du, et al., "Control Strategy Study of STATCOM Based on Cascaded PWM H-bridge Converter With Delta Configuration", Power Electronics and Motion Control Conference (IPEMC), 2012 7th International, IEEE, Jun. 2, 2012 (Jun. 2, 2012), pp. 345-350, XP032215740, DOI: 10.1109/IPEMC.2012.6258870, ISBN: 978-1-4577-2085-7.

* cited by examiner

ELECTRIC POWER CONVERSION DEVICE

TECHNICAL FIELD

The present invention relates to a three-phase electric power conversion device having arms which are delta-connected and each of which includes a plurality of unit cells each composed of a plurality of semiconductor switches and a DC capacitor and connected in cascade.

BACKGROUND ART

In large-capacity electric power conversion devices, the converter output is high voltage or large current, and therefore, many large-capacity electric power conversion devices are configured with a plurality of converters multiplexed in series or parallel. It is known that multiplexing converters not only increases the converter capacity, but also reduces harmonics contained in an output voltage waveform by synthesizing outputs, thus reducing harmonic current flowing to outside of the conversion device.

There are various methods for multiplexing a converter: reactor multiplexing, transformer multiplexing, direct multiplexing, etc. In the case of transformer multiplexing, since an AC side is isolated by transformers, there is an advantage that common direct current can be used among the transformers. However, there is a disadvantage that, in the case where output voltage is high, the configuration of the multiplexed transformer is complicated and the cost of the transformer increases (for example, Patent Document 1).

Considering the above, as an electric power conversion device that is suitable for high-voltage usage and does not require a multiplexed transformer, a multilevel converter is proposed in which outputs of a plurality of converters are connected in cascade. One example of such multilevel converters is a modular multilevel converter (hereinafter, referred to as an MMC). Since the MMC can be configured to have high withstand voltage and a large capacity, the MMC is a converter that can be interconnected to a power grid, and a wide range of applications thereof is being considered, e.g., high-voltage DC (HVDC) power transmission, BTB (Back To Back) (asynchronous interconnection device), a frequency conversion (FC) device, and a static synchronous compensator (STATCOM).

The MMC is composed of an arm in which a plurality of unit converters called cells (hereinafter, referred to as unit cells) are connected in cascade. Each unit cell includes a plurality of semiconductor switches and a DC capacitor, and through ON/OFF control of the semiconductor switches, outputs the voltage across the DC capacitor or zero voltage.

A three-phase MMC can have various configurations depending on a connection manner for arms. One of such converter configurations is a delta-connection cascade configuration. A delta-connection cascade converter has arms which are delta-connected and each of which includes a plurality of unit cells connected in cascade, to which a reactor is further connected in series, and the delta-connection cascade converter is connected in parallel to an AC power grid via a reactor or a transformer. Thus, two current components exist: current flowing between the grid and each phase, and current circulating within the delta-connection circuitry of the converter without being outputted to the grid side. Therefore, in the three-phase MMC, it is necessary to control these current components. A DC capacitor is provided in each cell, and the DC capacitor does not have a power supply. Therefore, it is necessary to control the voltage of the DC capacitor within a certain range.

In the three-phase MMC, it is necessary to control a plurality of current components and DC capacitor voltage. A method for controlling imbalance of DC capacitor voltages among phases due to grid imbalance by using circulating current is disclosed (for example, Patent Document 1).

CITATION LIST

Patent Document

Patent Document 1: Japanese Laid-Open Patent Publication No. 2011-223784 (paragraphs [0027] to [0085], FIG. 1)

SUMMARY OF THE INVENTION

Problems to be Solved by the Invention

As a feature of the three-phase MMC, when the grid is balanced, control is performed so that reactive current flows with a phase difference by 90 degrees from grid voltage, whereby the DC capacitor voltages become constant and thus are balanced. However, when the grid is unbalanced, the same current as in the balanced state flows while the grid voltage is unbalanced, and thus active current flows on the grid voltage, whereby the capacitors are charged and discharged to be unbalanced. Therefore, when the grid is unbalanced, the DC voltages are unbalanced.

In the invention disclosed in Patent Document 1, upon grid failure with a high imbalance rate, it is necessary to cause large circulating current to flow for balancing the DC capacitor voltages among the phases, thus causing a problem that current flowing through the converter, i.e., a power conversion unit, increases.

The present invention has been made to solve the above problem, and an object of the present invention is to provide an electric power conversion device that enables reduction in current flowing through a power conversion unit in balancing the DC capacitor voltages among phases when a grid is unbalanced.

Solution to the Problems

An electric power conversion device according to the present invention includes: a power conversion unit connected to a three-phase AC circuit; and a converter control unit for controlling the power conversion unit. The power conversion unit includes three arms connected to the AC circuit and connected in a delta-connection manner. Each arm has one or a plurality of unit cells connected in cascade, to which a reactor is connected in series. Each unit cell includes a series unit of a plurality of semiconductor switches connected in series to each other, and a DC capacitor connected in parallel to the series unit. The converter control unit includes: a phase DC voltage control unit for calculating phase arm current command values on the basis of DC capacitor voltages of the cells; a negative sequence current command value calculation unit for calculating a negative sequence current command value on the basis of the phase arm current command values; an output current control unit for, on the basis of the negative sequence current command value and a predetermined positive sequence current command value, calculating a voltage command value including both a positive sequence component and a negative sequence component, for controlling output current of the power conversion unit; a circulating current control unit for, on the basis of the phase arm current command values, calculating a zero sequence voltage command value for controlling circulating current; a voltage command value calculation unit for calculating an output voltage command value for each unit cell on the basis of the voltage command value including both the positive sequence component and the negative sequence component, the zero sequence voltage command value, the cell DC capacitor voltages, and the phase arm currents; and a gate signal generation unit for calculating a gate signal for controlling each semiconductor switch in the unit cell on the basis of the output voltage command value. Imbalance of the cell DC capacitor voltages among phases due to grid imbalance is controlled by the circulating current and the negative sequence current.

Effect of the Invention

The electric power conversion device according to the present invention is configured as described above and controls imbalance of the cell DC capacitor voltages among phases due to grid imbalance, by circulating current and negative sequence current. Thus, when the grid is unbalanced, increase in unit cell current relative to a steady state is suppressed, and therefore the rated current of the power conversion unit can be reduced and the electric power conversion device can be downsized.

DESCRIPTION OF EMBODIMENTS

Embodiment 1

Embodiment 1 relates to an electric power conversion device including a power conversion unit and a converter control unit, wherein the converter control unit includes three voltage control systems (phase DC voltage control unit, overall voltage control unit, cell DC voltage control unit), two current control systems (output current control unit, circulating current control unit), two calculation units (negative sequence current command value calculation unit, phase voltage command value calculation unit), and a gate signal generation unit, and imbalance of cell DC voltages among phases due to grid imbalance is controlled by circulating current and negative sequence current.

Hereinafter, the configuration and operation of an electric power conversion device 1 according to embodiment 1 of the present invention will be described on the basis of FIG. 1 which is an entire configuration diagram of the electric power conversion device, FIGS. 2 and 3 which are circuit diagrams of a unit cell, FIG. 4 which is a block diagram of a converter control unit, FIG. 5 which is a block diagram of a phase DC voltage control unit, FIG. 6 which is a block diagram of an overall voltage control unit, FIG. 7 which is a block diagram of a negative sequence current command value calculation unit, FIG. 8 which is a block diagram of an output current control unit, FIG. 9 which is a block diagram of a circulating current control unit, FIG. 10 which is a block diagram of a voltage command value calculation unit, and FIG. 11 which is a block diagram of a cell DC voltage control unit.

Figure 1:
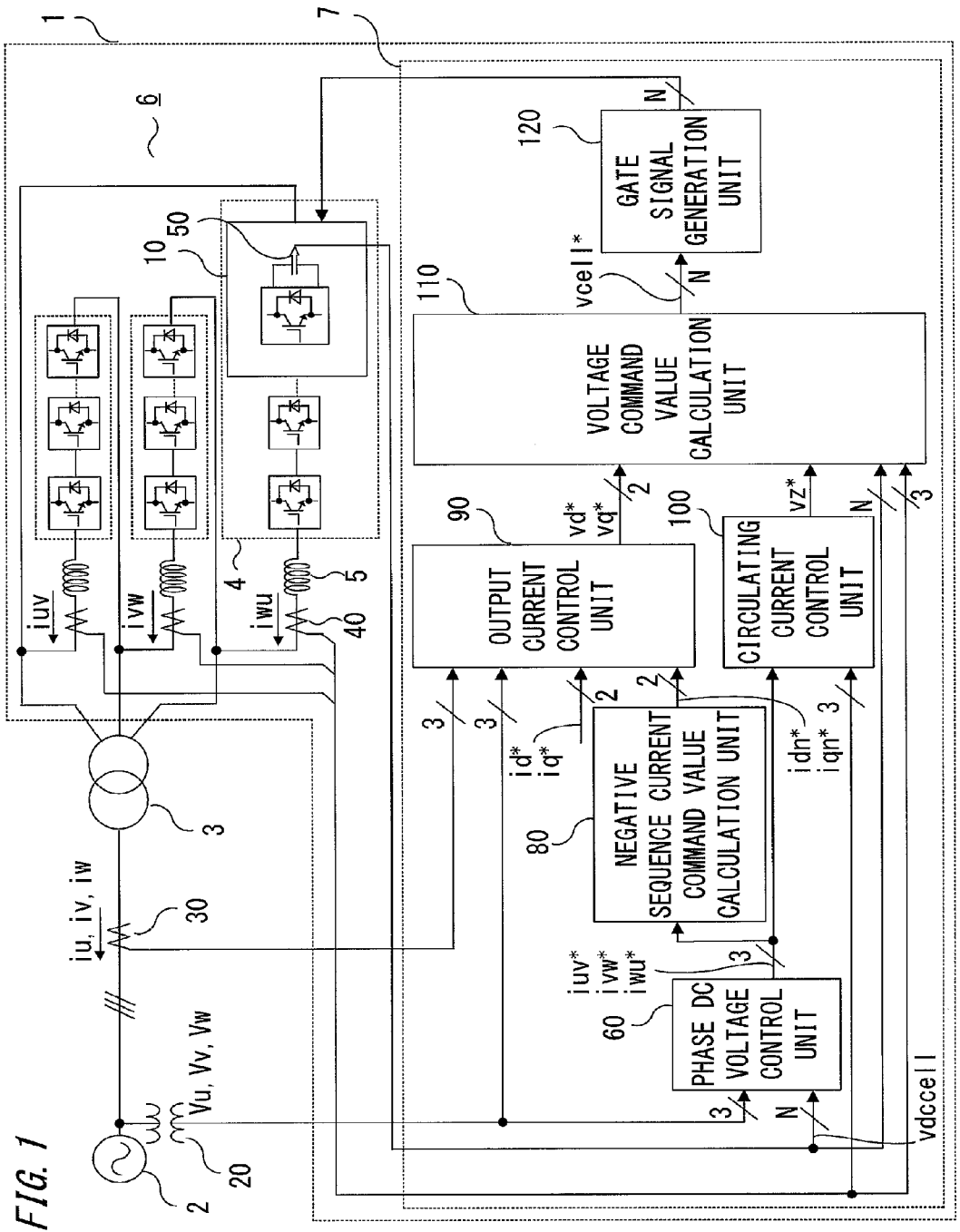
FIG. 1 is an entire configuration diagram of an electric power conversion device according to embodiment 1 of the present invention.

FIG. 1 shows the configuration of the entire system including the electric power conversion device 1 in embodiment 1 of the present invention. The entire system is composed of the electric power conversion device 1, an AC power grid 2, and a transformer 3, and the electric power conversion device 1 is connected in parallel to the AC power grid 2 via the transformer 3.

Although the electric power conversion device 1 is connected to the AC power grid 2 via the transformer 3 in FIG. 1, the electric power conversion device 1 may be connected via an interconnection reactor.

Next, the entire configuration of the electric power conversion device 1 will be described on the basis of FIG. 1. The electric power conversion device 1 is composed of a power conversion unit 6 and a converter control unit 7.

The power conversion unit 6 includes arms 4 for respective phases, and each arm 4 is formed by connecting a plurality of unit cells 10 and further an arm reactor 5 in series. The arms 4 for the phases are delta-connected, and a connection end of each phase arm is connected to the AC power grid 2.

The arm reactor 5 is interposed for suppressing a circulating current component described later. As long as the arm reactor 5 is connected in series to the unit cells 10, the interposing position thereof is not limited to that shown in FIG. 1, and a plurality of arm reactors may be interposed in a distributed manner.

The power conversion unit 6 includes an arm current detection unit 40 for detecting current of each arm 4. Further, the power conversion unit 6 includes a DC capacitor voltage detection unit 50 for detecting voltage of a DC capacitor 15 of each unit cell 10 as described later. The power conversion unit 6 receives a voltage signal from an AC voltage detection unit 20 for detecting AC voltage of the AC power grid 2, and further receives a current signal from an output current detection unit 30 for detecting output current of the AC power grid 2.

As for the configuration of the converter control unit 7 in FIG. 1, communications of signals with the AC power grid 2 and the power conversion unit 6 are mainly shown, and thus a part of the configuration is not shown. The configuration and function of the converter control unit 7 will be described later on the basis of FIG. 4.

Next, the specific internal configuration of the unit cell 10 will be described on the basis of FIG. 2 and FIG. 3.

Figure 2:
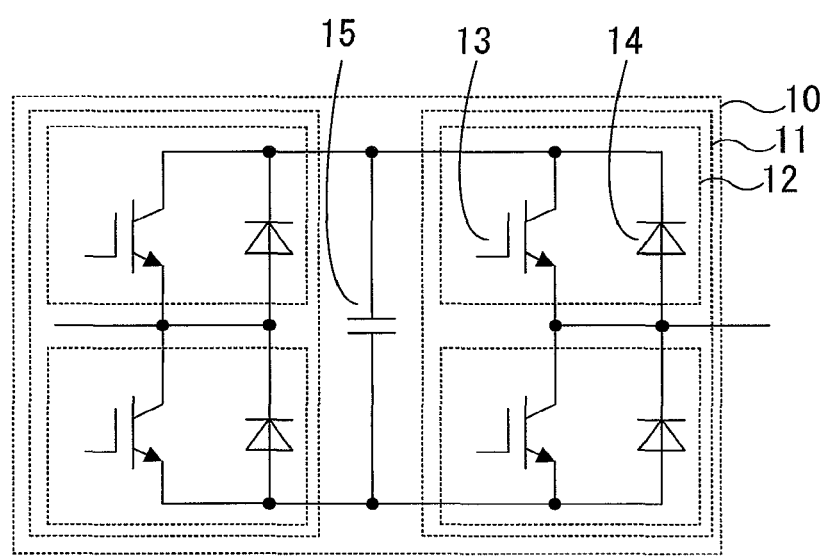
FIG. 2 is a circuit diagram showing the internal configuration of a unit cell of the electric power conversion device according to embodiment 1 of the present invention.

FIG. 2 is a circuit diagram showing the internal configuration of the unit cell 10. The unit cell 10 having a full-bridge configuration has two series units 11 which are connected in parallel and each of which is composed of self-turn-off switching elements 13 such as IGBTs (Insulated-Gate Bipolar Transistors), and further has the DC capacitor 15 connected in parallel thereto. Each series unit 11 is composed of a plurality of (here, two) semiconductor switches 12 which are connected in series and each of which is composed of the switching element 13 and a diode 14 connected in antiparallel thereto. As shown in FIG. 2, in the unit cell 10, terminals of the semiconductor switches 12 corresponding to the internal intermediate connection points of the respective series units 11 are used as output terminals, and through ON/OFF control of the switching elements 13, the same-polarity voltage or opposite-polarity voltage of the DC capacitor 15 or zero voltage is outputted from the output terminals.

Another configuration example of the unit cell 10 will be described on the basis of FIG. 3. FIG. 3 is a circuit diagram showing the internal configuration of the unit cell 10 having a half-bridge configuration. In FIG. 3, the unit cell 10 is composed of: the series unit 11 composed of the switching elements 13; and the DC capacitor 15 connected in parallel to the series unit 11. The series unit 11 is composed of a plurality of (here, two) semiconductor switches 12 which are connected in series and each of which is composed of the switching element 13 and the diode 14 connected in antiparallel thereto. As shown in FIG. 3, in the unit cell 10, both terminals of one of the semiconductor switches 12 are used as output terminals, and through ON/OFF control of the switching elements 13, the same-polarity voltage of the DC capacitor 15 or zero voltage is outputted from the output terminals.

Figure 3:
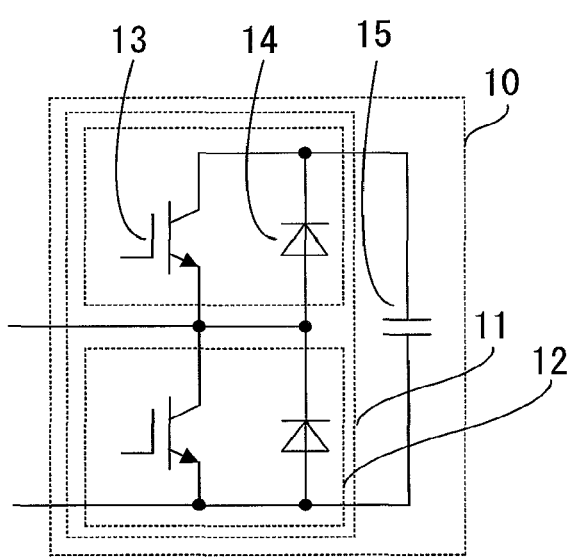
FIG. 3 is a circuit diagram of another internal configuration of the unit cell of the electric power conversion device according to embodiment 1 of the present invention.

The configuration of the unit cell 10 is not limited to those in FIG. 2 and FIG. 3 as long as the unit cell 10 has a series unit composed of semiconductor switches, and a DC capacitor connected in parallel to the series unit, and is configured to selectively output the DC capacitor voltage at the output ends by means of the semiconductor switches of the series unit.

Hereinafter, "unit cell" may be referred to as "cell".

Next, control of the electric power conversion device 1 of the present invention will be described. FIG. 4 is the entire block diagram of the converter control unit 7 for controlling the power conversion unit 6 in embodiment 1 of the present invention. The converter control unit 7 includes, as main components, three voltage control systems (phase DC voltage control unit 60, overall voltage control unit 70, cell DC voltage control unit 140), two current control systems (output current control unit 90, circulating current control unit 100), and two calculation units (negative sequence current command value calculation unit 80, phase voltage command value calculation unit 130). Here, a function unit including the phase voltage command value calculation unit 130 and the cell DC voltage control unit 140 corresponds to the voltage command value calculation unit 110.

First, the summary of the function of the converter control unit 7, particularly, control of current that circulates among the phases and calculation of a negative sequence current command value for balancing DC capacitor voltages of the cells of the electric power conversion device 1 among the phases, corresponding to a major part of the present invention, will be described. Further, the configuration and function of each unit in the converter control unit 7 will be sequentially described.

First, the summary of the function of the converter control unit 7 will be described.

The output current control unit 90 controls active current iq and reactive current id, thereby performing power control of the power conversion unit 6. Positive sequence current command values id* and iq* are composed of a positive sequence reactive current command value id* and a positive sequence active current command value iq*, and are predetermined values determined from the operation condition of the electric power conversion device 1. Here, the positive sequence active current command value iq* is calculated by, for example, the overall voltage control unit 70, and the positive sequence reactive current command value id* is calculated from, for example, positive sequence voltage of the AC power grid 2.

The circulating current control unit 100 controls current flowing within the delta-connection circuitry, thereby balancing the DC capacitor voltages among the phases. A circulating current command value iz* for controlling the circulating current is calculated by the phase DC voltage control unit 60.

The cell DC voltage control unit 140 controls DC capacitor voltage of each cell. An output voltage command value vcell* is calculated on the basis of: voltage command values vd* and vq* which are outputted from the output current control unit 90 and include both a positive sequence component and a negative sequence component; a zero sequence voltage command value vz* outputted from the circulating current control unit 100; each cell DC voltage vcell; and arm currents iuv, ivw, iwu.

Hereinafter, "DC capacitor voltage" may be referred to as "DC voltage".

For describing the configuration and function of each unit in the converter control unit 7, current and voltage elements in FIG. 4 will be described.

vu, vv, vw: grid voltage
iu, iv, iw: output current
iuv, ivw, iwu: arm current vdccell: each cell DC voltage (N: number n of cells in each arm times three arms)

iuv*, ivw*, iwu*: arm current command value id*, iq*: positive sequence current command value idn*, iqn*: negative sequence current command value vd*, vq*: voltage command values including both positive sequence component and negative sequence component vz*: zero sequence voltage command value vcell*: output voltage command value (N: number n of cells in each arm times three arms)

vuv*, vvw*, vwu*: arm voltage command value

Next, the configuration and operation of the phase DC voltage control unit 60 in the converter control unit 7 will be described on the basis of FIG. 5.

Figure 5:
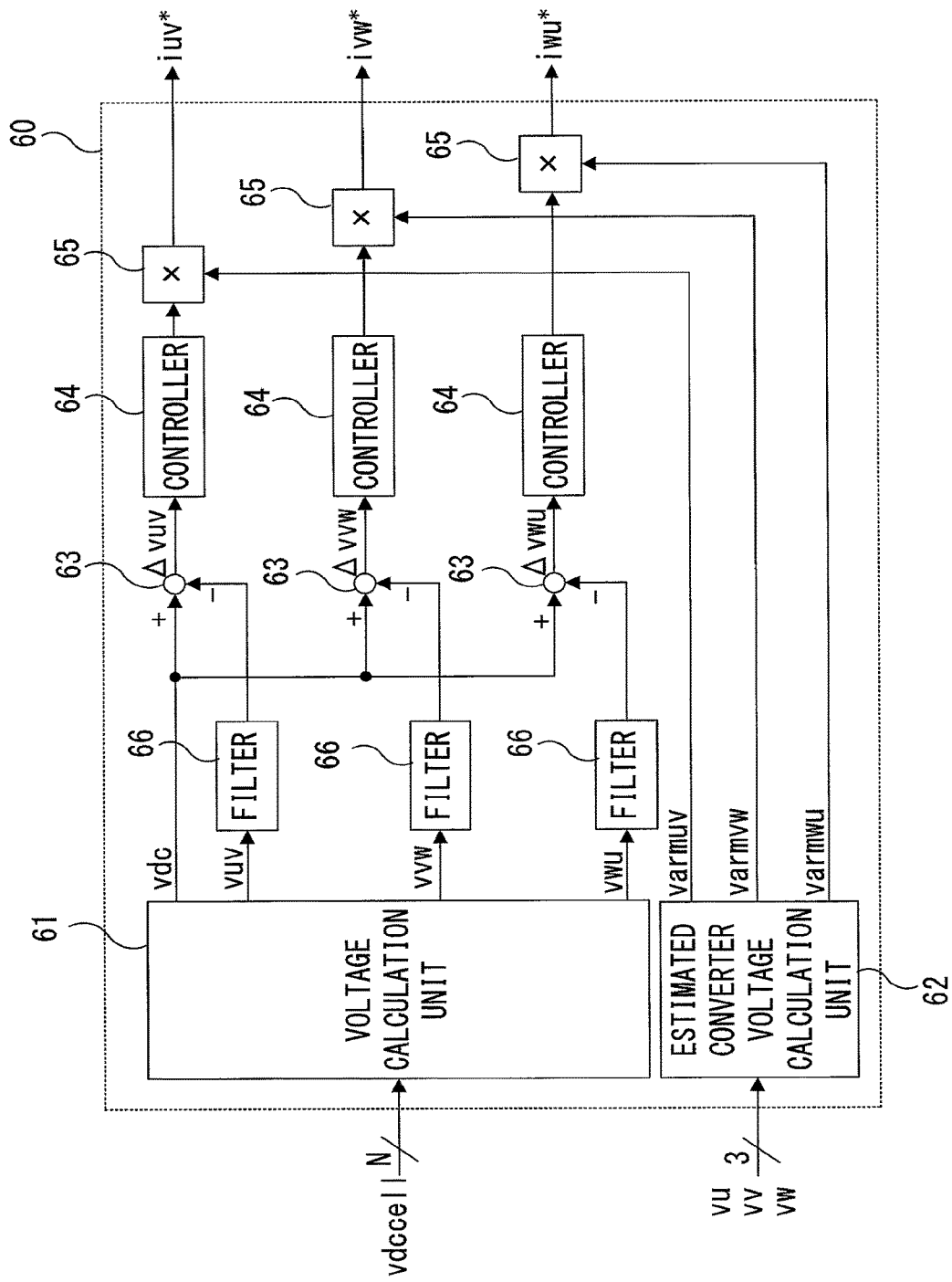
FIG. 5 is a block diagram showing the internal configuration of a phase DC voltage control unit of the electric power conversion device according to embodiment 1 of the present invention.

FIG. 5 is a block diagram showing the internal configuration of the phase DC voltage control unit 60 in the converter control unit 7 of the electric power conversion device 1 in embodiment 1.

The phase DC voltage control unit 60 is composed of a voltage calculation unit 61, an estimated converter voltage calculation unit 62, subtractors 63, controllers 64, a multiplier 65, and filters 66.

In the phase DC voltage control unit 60, the voltage calculation unit 61 calculates, from all the cell DC capacitor voltages vdccell, a representative voltage value vdc such as the average value, the maximum value, or the minimum value among all the cell DC capacitor voltages, and representative values vuv, vvw, vwu of the respective phase voltages on the basis of each cell DC voltage vdccell. The subtractors 63 calculate errors Δvuv, Δvvw, Δvwu between the representative value vdc of all the cell DC capacitor voltages and the representative values vuv, vvw, vwu of the respective phase voltages. The controllers 64 calculate respective phase current command values so that the errors Δvuv, Δvvw, Δvwu become zero, that is, the representative values vuv, vvw, vwu of the respective phase voltages follow the representative value vdc of all the cell DC capacitor voltages.

The representative values vuv, vvw, vwu of the respective phase voltages oscillate at 2f (f is the fundamental frequency). Therefore, before the representative values vuv, vvw, vwu are inputted to the subtractors 63, 2f AC components thereof are removed by the filters 66 so as to output only DC components.

In order to charge or discharge the DC capacitor 15 in each cell 10, it is necessary to control active power. Therefore, outputs of the controllers 64 are multiplied by output voltages of the arms 4, thereby calculating arm current command values. However, since the electric power conversion device 1 does not have a mechanism for detecting output voltages of the arms 4, estimated converter voltages varmuv, varmvw, varmwu having the same phases as output voltages of the arms 4 are calculated using detected values of the grid voltages or the like.

The multipliers 65 calculate products between the components (estimated converter voltages) varmuv, varmvw, varmwu having the same phase as voltage of the transformer 3, and outputs of the controllers 64. Here, as the estimated converter voltages varnuv, varmvw, varmwu, values obtained by the estimated converter voltage calculation unit 62 calculating line-to-line voltages from the grid voltages vu, vv, vw are used. That is, the arm current command values itv*, iwg*, iwu* outputted from the phase DC voltage control unit 60 are values obtained by multiplying the outputs of the controllers 64 by the estimated converter voltages.

Next, the configuration and operation of the overall voltage control unit 70 in the converter control unit 7 will be described on the basis of FIG. 6.

Figure 6:
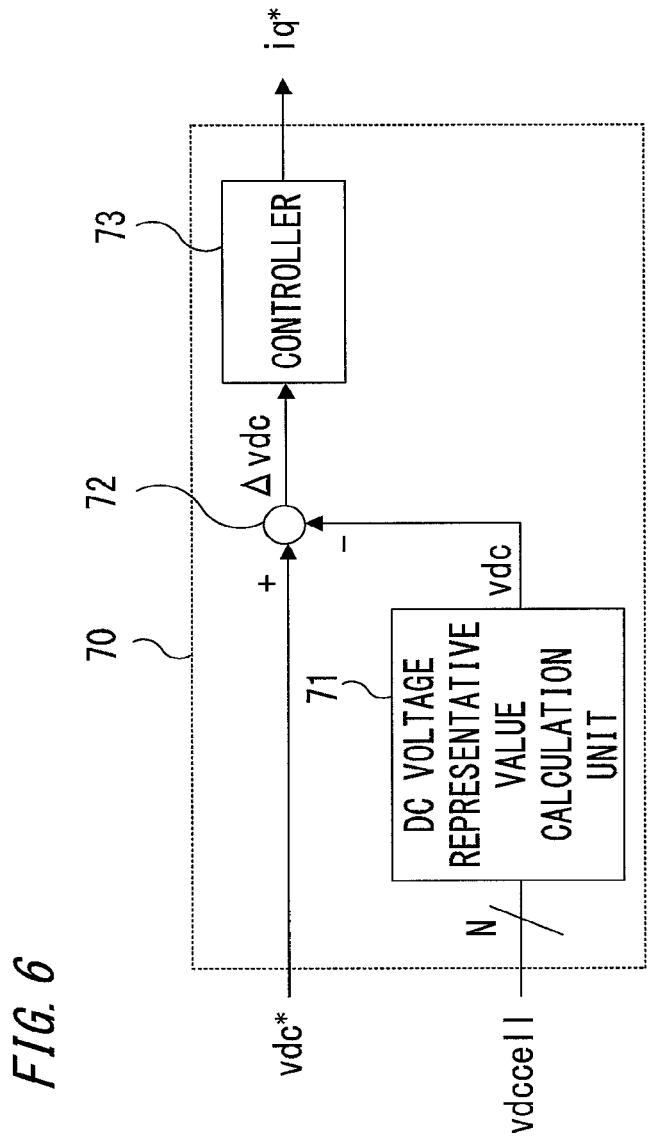
FIG. 6 is a block diagram showing the configuration of an overall voltage control unit of the electric power conversion device according to embodiment 1 of the present invention.

FIG. 6 is a block diagram showing the internal configuration of the overall voltage control unit 70 of the electric power conversion device 1 according to embodiment 1 of the present invention. The overall voltage control unit 70 is composed of a DC voltage representative value calculation unit 71, a subtractor 72, and a controller 73.

In the overall voltage control unit 70, the DC voltage representative value calculation unit 71 calculates a voltage representative value vdc such as the average value, the maximum value, or the minimum value among all the cell DC capacitor voltages, from all the cell DC capacitor voltages vdccell. The subtractor 72 calculates error Δvdc between a DC overall voltage command value vdc* and the voltage representative value vdc calculated by the DC voltage representative value calculation unit 71. The DC overall voltage command value vdc* is set at 1.

The controller 73 calculates the positive sequence active current command value iq* so that the calculated error Δvdc becomes zero, that is, the representative value vdc of all the cell DC capacitor voltages follows the DC overall voltage command value vdc*.

By using, as the voltage representative value, either the average value among all the cell DC capacitor voltages or the average value of the maximum value or the minimum value thereof, the DC capacitor voltages of all the cells are controlled to be constant.

Next, the configuration and operation of the negative sequence current command value calculation unit 80 in the converter control unit 7 will be described on the basis of FIG. 7.

Figure 7:
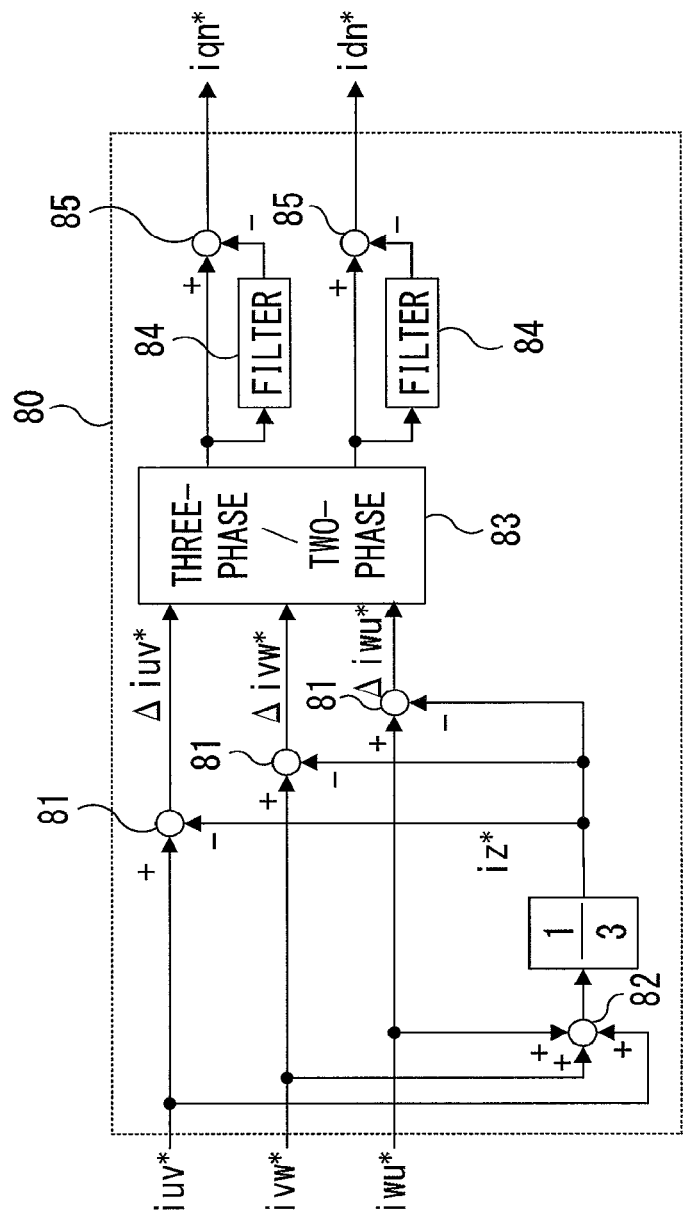
FIG. 7 is a block diagram showing the internal configuration of a negative sequence current command value calculation unit of the electric power conversion device according to embodiment 1 of the present invention.

FIG. 7 is a block diagram showing the internal configuration of the negative sequence current command value calculation unit 80 of the electric power conversion device 1 according to embodiment 1 of the present invention. The negative sequence current command value calculation unit 80 is composed of subtractors 81 and 85, an adder 82, a three-phase/two-phase coordinate conversion unit 83, and filters 84.

The negative sequence current command value calculation unit 80 calculates the negative sequence current command values idn* and iqn* from the arm current command values iuv*, ivw*, iwu*. The negative sequence current command values idn* and iqn* are composed of a negative sequence reactive current command value and a negative sequence active current command value.

The arm current command values iuv*, ivw*, iwu* outputted from the phase DC voltage control unit 60 are summed by the adder 82, and then divided by three, thereby calculating the circulating current command value iz*.

The subtractors 81 calculate differences a Δiuv*, Δivw*, Δiwu* between the arm current command values iuv*, ivw*, iwu* outputted from the phase DC voltage control unit 60, and the circulating current command value iz*, thereby extracting a positive sequence component and a negative sequence component. The three-phase/two-phase coordinate conversion unit 83 performs three-phase to two-phase coordinate conversion of the extracted positive sequence component and negative sequence component, in a positive sequence coordinate system.

The subtractors 85 subtract outputs of the filters 84 which extract positive sequence components from outputs of the three-phase/two-phase coordinate conversion unit 83, thereby calculating the negative sequence current command values idn* and iqn*.

The filters 84 used for extracting positive sequence components have a function of removing negative sequence components from the filter input values to extract the positive sequence components. In a positive sequence coordinate system, a positive sequence component is a DC component, and a negative sequence component is an AC component (2f) twice as high as a fundamental frequency. Therefore, a first-order-lag filter, a 2f moving average filter, a 2f notch filter, or the like is used.

Next, the configuration and operation of the output current control unit 90 in the converter control unit 7 will be described on the basis of FIG. 8.

Figure 8:
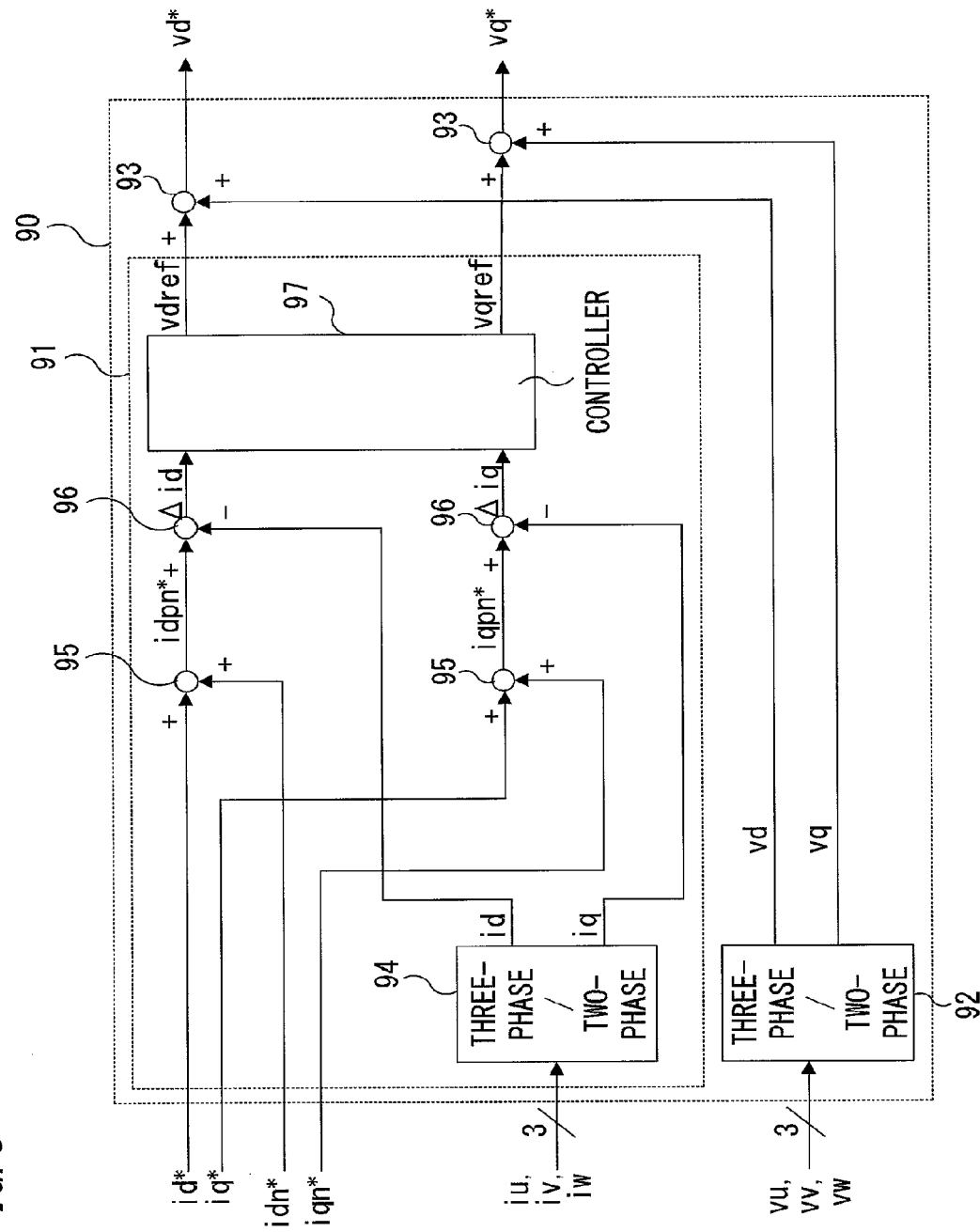
FIG. 8 is a block diagram showing the internal configuration of an output current control unit of the electric power conversion device according to embodiment 1 of the present invention.

FIG. 8 is a block diagram showing the internal configuration of the output current control unit 90 of the electric power conversion device 1 according to embodiment 1 of the present invention. The output current control unit 90 is composed of a reference voltage calculation unit 91, a three-phase/two-phase coordinate conversion unit 92, and adders 93. The reference voltage calculation unit 91 is composed of a three-phase/two-phase coordinate conversion unit 94, adders 95, subtractors 96, and a controller 97.

In the output current control unit 90, the adders 95 sum the positive sequence current command values id* and iq* and the negative sequence current command values idn* and iqn*, respectively, thereby calculating current command values idpn* and iqpn*.

$$idpn^* = id^* + idn^* \quad (1)$$

$$iqpn^* = iq^* + iqn^* \quad (2)$$

The three-phase/two-phase coordinate conversion unit 94 performs three-phase to two-phase conversion of the output currents iu, iv, iw, in a positive sequence coordinate system, thereby calculating the reactive current id and the active current iq. The subtractors 96 calculate errors Δid and Δiq between the current command values idpn* and iqpn* and the reactive current id and the active current iq outputted from the three-phase/two-phase coordinate conversion unit 94.

The controller 97 performs calculation so that the calculated errors Δid and Δiq become zero, that is, the reactive current id and the active current iq follow the current command values idpn* and iqpn*, to output positive-negative sequence reference voltages vdref and vqref.

The three-phase/two-phase coordinate conversion unit 92 performs three-phase to two-phase conversion of the grid voltages vu, vv, vw, in a positive sequence coordinate system, thereby calculating the positive-negative sequence voltages vd and vq.

In the output current control unit 90, the adders 93 add the positive sequence voltages vd and vq to the positive-negative sequence reference voltages (vdref, vqref) outputted from the controller 97, in a feed-forward manner, thereby calculating the voltage command values Vd* and vq* including both a positive sequence component and a negative sequence component. The voltage command values vd* and vq* including both a positive sequence component and a negative sequence component are composed of the reactive voltage command value vd* including both a positive sequence component and a negative sequence component, and the active voltage command value vq* including both a positive sequence component and a negative sequence component.

Next, the configuration and operation of the circulating current control unit 100 in the converter control unit 7 will be described on the basis of FIG. 9. Here, current control for balancing the DC capacitor voltages among the phases in the electric power conversion device 1 of the present invention will be described.

Figure 9:
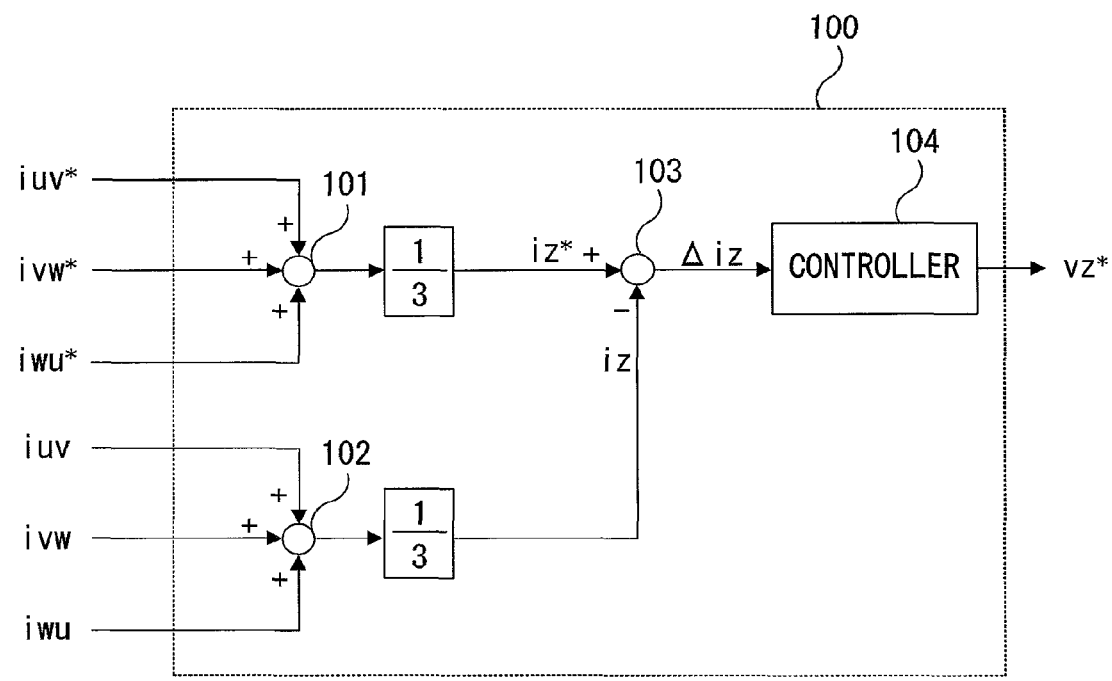
FIG. 9 is a block diagram showing the internal configuration of a circulating current control unit of the electric power conversion device according to embodiment 1 of the present invention.

FIG. 9 is a block diagram showing the internal configuration of the circulating current control unit 100 of the electric power conversion device 1 according to embodiment 1 of the present invention. The circulating current control unit 100 is composed of adders 101 and 102, a subtractor 103, and a controller 104.

In the circulating current control unit 100, the arm current command values iuv*, ivw*, iwu* outputted from the phase DC voltage control unit 60 are summed by the adder 101, and then divided by three, thereby calculating the circulating current command value iz*. The arm current values iuv, ivw, iwu are summed by the adder 102, and then divided by three, thereby calculating the circulating current iz.

The subtractor 103 calculates the error Δiz between the circulating current command value iz* and the circulating current iz. The controller 104 calculates the zero sequence voltage command value vz* so that the error Δiz becomes zero, that is, the circulating current iz follows the circulating current command value iz*.

Next, the configuration and operation of the voltage command value calculation unit 110 in the converter control unit 7 will be described on the basis of FIG. 10.

Figure 10:
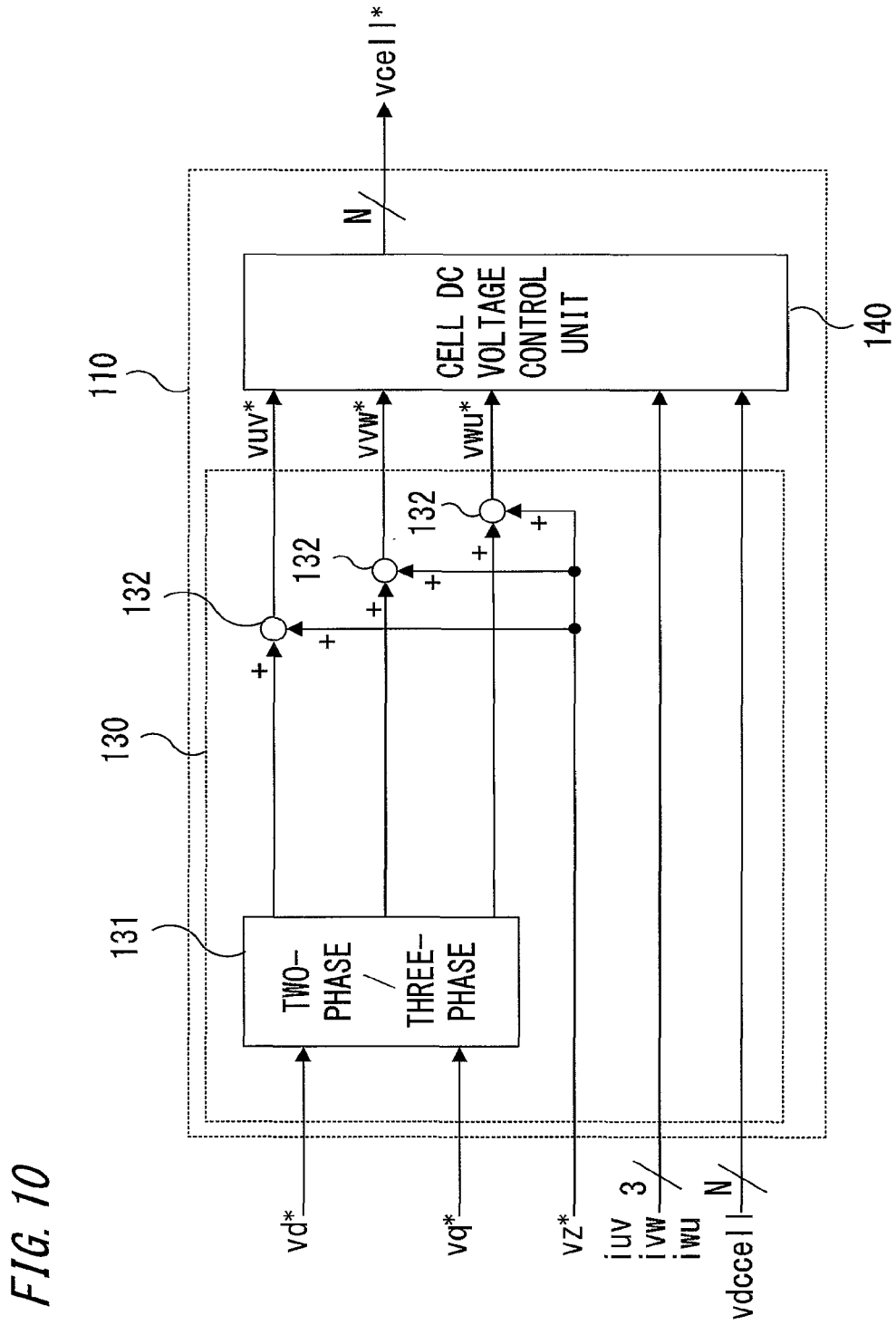
FIG. 10 is a block diagram showing the internal configuration of a voltage command value calculation unit of the electric power conversion device according to embodiment 1 of the present invention.

FIG. 10 shows the internal configuration of the voltage command value calculation unit 110. The voltage command value calculation unit 110 is composed of a phase voltage command value calculation unit 130 and a cell DC voltage control unit 140.

The phase voltage command value calculation unit 130 is composed of a two-phase/three-phase coordinate conversion unit 131 and adders 132. The internal configuration of the cell DC voltage control unit 140 will be described later.

The voltage command value calculation unit 110 as a whole calculates the output voltage command values vcell for the respective unit cells 10 on the basis of: the voltage command values vd* and vq* including both a positive sequence component and a negative sequence component; the zero sequence voltage command value vz*; the cell DC voltages vdccell; and the phase arm currents iuv, ivw, iwu.

The phase voltage command value calculation unit 130 calculates the arm voltage command value for each phase, and the cell DC voltage control unit 140 calculates the output voltage command value for each cell.

In the phase voltage command value calculation unit 130, the two-phase/three-phase coordinate conversion unit 131 converts the voltage command values vd* and vq* including both a positive sequence component and a negative sequence component, into three phases, in a positive sequence coordinate system. The adders 132 add the zero sequence voltage command value vz* to the voltage command values which have been converted into three phases and include both a positive sequence component and a negative sequence component, thereby calculating the phase arm voltage command values vuv*, vvw*, vwu*.

Although described later in detail, the cell DC voltage control unit 140 calculates the output voltage command values vcell* for the respective cells on the basis of the phase arm voltage command values vuv*, vvw*, vwu* the arm currents iuv, ivw, iwu, and the cell DC voltages vdccell.

Next, the configuration and operation of the cell DC voltage control unit 140 in the converter control unit 7 will be described on the basis of FIG. 11.

Figure 11:
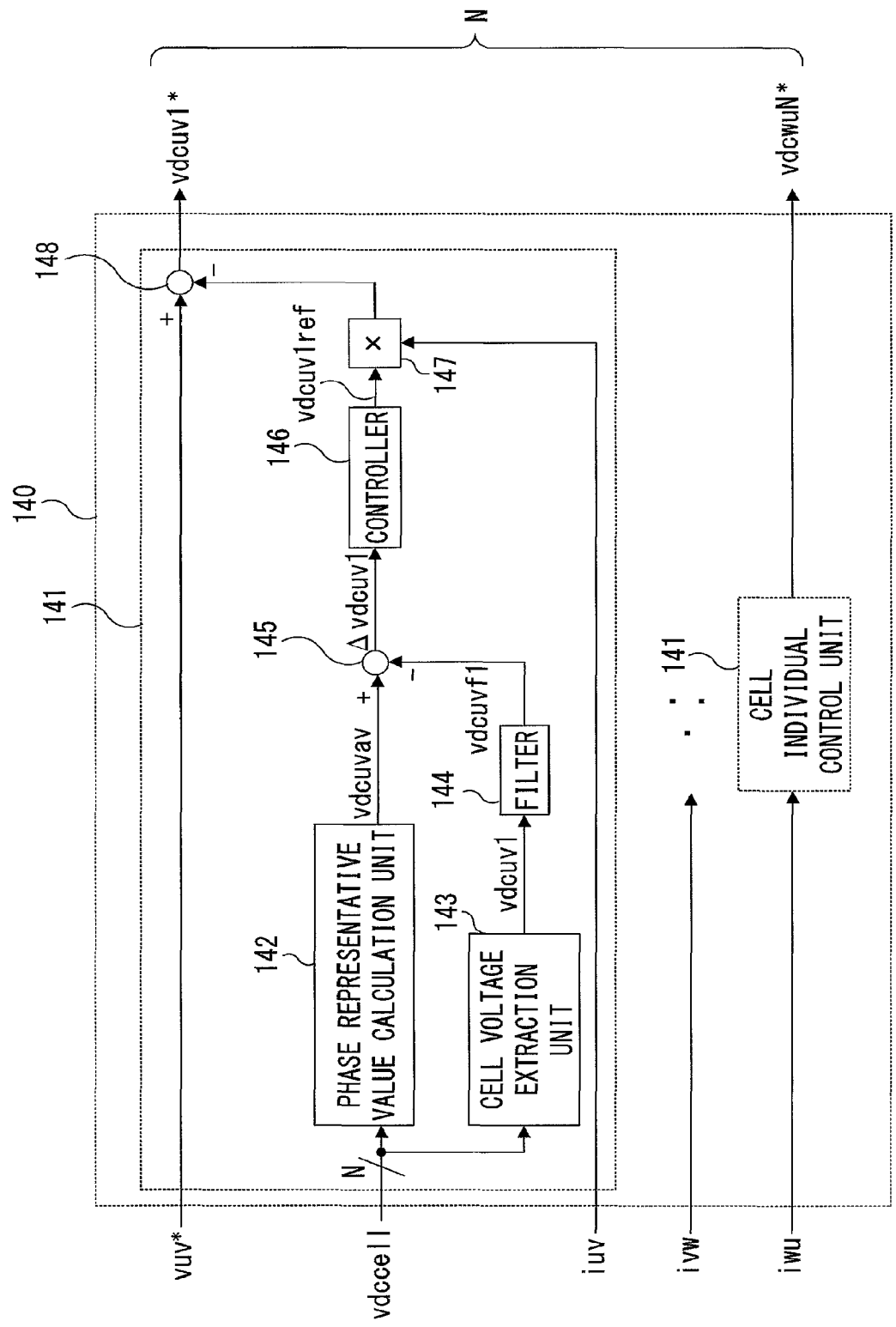
FIG. 11 is a block diagram showing the internal configuration of a cell DC voltage control unit of the electric power conversion device according to embodiment 1 of the present invention.

FIG. 11 is a block diagram showing the internal configuration of the cell DC voltage control unit 140. The cell DC voltage control unit 140 includes cell individual control units 141 corresponding to the N number of cells. Each cell individual control unit 141 is composed of a phase representative value calculation unit 142, a cell voltage extraction unit 143, a filter 144, subtractors 145 and 148, a controller 146, and a multiplier 147.

In the cell individual control unit 141, the phase representative value calculation unit 142 calculates a phase voltage representative value vdcuvav such as the average value, the maximum value, or the minimum value of the DC capacitor voltages for each phase, from the cell DC voltages vdccell. The cell voltage extraction unit 143 calculates a cell DC voltage vdcuv1 from the cell DC voltages vdccell. The filter 144 removes an AC component having a frequency of 2f from the cell DC voltage vdcuv1, thereby calculating vdcuvf1. The subtractor 145 subtracts vdcuvf1 from the phase voltage representative value vdcuvav, thereby calculating an error Δvdcuv1. The controller 146 calculates vdcuv1ref so that the calculated error Δvdcuv1 becomes zero.

Further, the multiplier 147 multiplies the control output vdcuv1ref by the arm current iuv having the same phase. The subtractor 148 subtracts output of the multiplier 147 from the phase arm voltage command value vuv*, thereby calculating a cell DC voltage command value vdcuv1*. The cell DC voltage command values vdcuv1* to vdcwuN* are the output voltage command values vcell* for the respective cells.

The gate signal generation unit 120 performs PWM control on the basis of the output voltage command values vcell* for the cells outputted from the voltage command value calculation unit 110, thereby calculating gate signals for controlling ON/OFF operations of the switching elements 13 in the cells.

As described above, the electric power conversion device in embodiment 1 includes a power conversion unit and a converter control unit, wherein the converter control unit includes three voltage control systems (phase DC voltage control unit, overall voltage control unit, cell DC voltage control unit), two current control systems (output current control unit, circulating current control unit), two calculation units (negative sequence current command value calculation unit, phase voltage command value calculation unit), and a gate signal generation unit, and imbalance of cell DC voltages among phases due to grid imbalance is controlled by circulating current and negative sequence current. Thus, in the electric power conversion device in embodiment 1, when the grid is unbalanced, increase in unit cell current relative to a steady state is suppressed, and therefore the rated current of the power conversion unit can be reduced and the electric power conversion device can be downsized. Thus, energy saving can be achieved.

Figure 4:
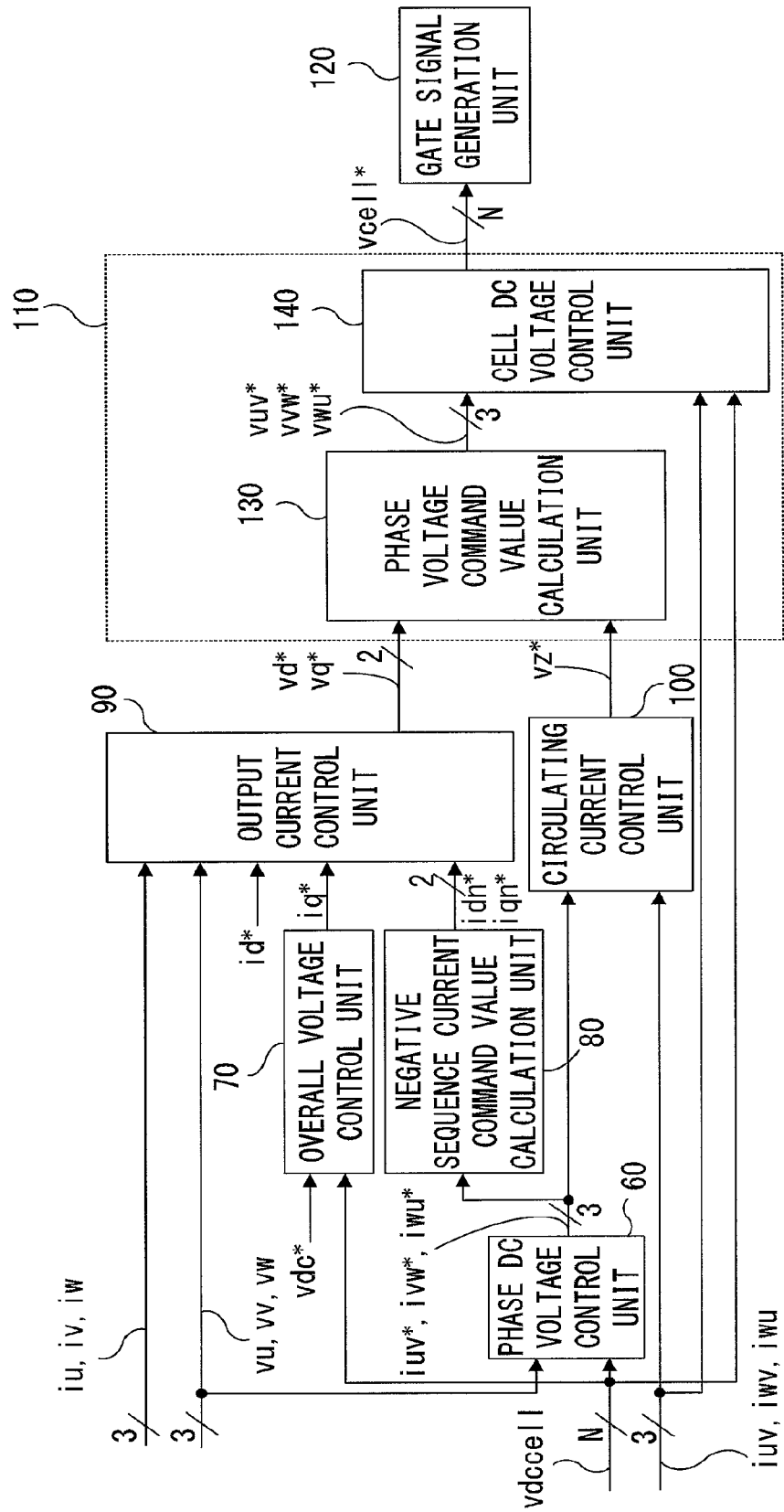
FIG. 4 is a block diagram showing the configuration of a converter control unit of the electric power conversion device according to embodiment 1 of the present invention.

In the present embodiment 1, the case where the positive sequence active current command value is calculated and generated from all the cell DC capacitor voltages and the DC overall voltage command value by the overall voltage control unit 70 shown in FIG. 4, has been described. However, a set value obtained by measuring, in advance, loss (for example, loss in the reactor or loss in the semiconductor switching element in the unit cell) in the electric power conversion device and calculating the positive sequence active current command value from the measured value, may be used.

In the present embodiment 1, the case where the positive sequence reactive current command value is calculated in the electric power conversion device from positive sequence voltage of the AC power grid, has been described. However, the positive sequence reactive current command value may be calculated from voltage of the grid power supply by a superior control system, and the electric power conversion device may receive the positive sequence reactive current command value from the superior control system, and use the same.

Embodiment 2

An electric power conversion device in embodiment 2 has a configuration in which a function unit for controlling negative sequence current is added in the output current control unit of the electric power conversion device in embodiment 1.

Hereinafter, the configuration and operation of a controller in the output current control unit of the electric power conversion device in embodiment 2 will be described on the basis of FIG. 12 which is a configuration diagram of a controller 297, focusing on a difference from embodiment 1.

The entire configuration of the electric power conversion device in embodiment 2 is the same as that of the electric power conversion device 1 in embodiment 1. The configuration of the controller 97 in the output current control unit 90 is different, and for the purpose of discrimination from the controller 97 in embodiment 1, the controller is denoted by 297 in FIG. 12.

The converter control unit (output current control unit) in embodiment 2 is different from the converter control unit (output current control unit) in embodiment 1 only in the configuration and function of the controller 297. The other configuration is the same as in embodiment 1, and therefore the description thereof is omitted.

Figure 12:
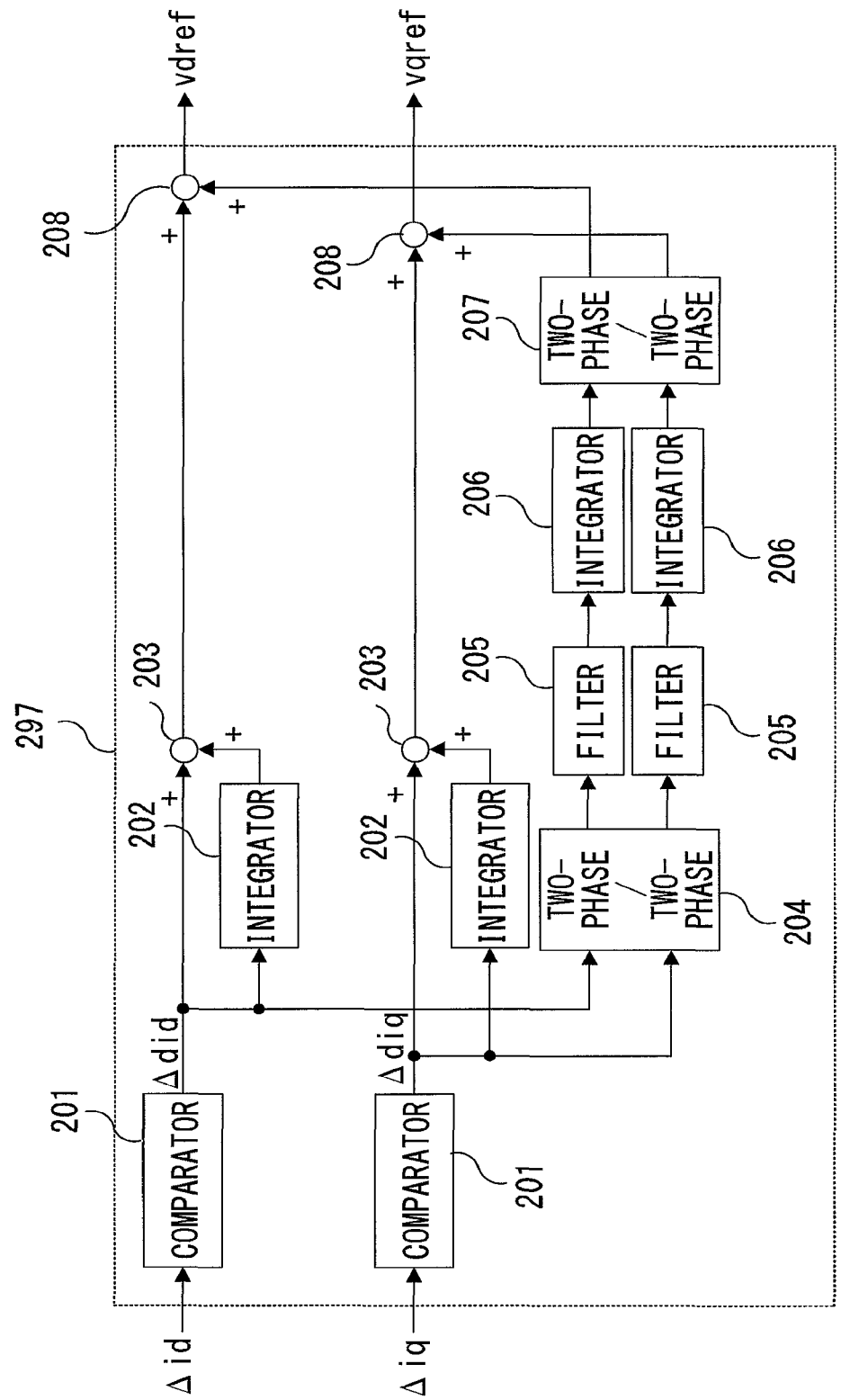
FIG. 12 is a block diagram showing the configuration of a controller in an output current control unit of an electric power conversion device according to embodiment 2 of the present invention.

In FIG. 12, the controller 297 is composed of comparators 201, integrators 202 and 206, adders 203 and 208, two-phase/two-phase coordinate conversion units 204 and 207, and filters 205.

The output current control unit including the controller 297 calculates the voltage command values vd* and vq* including both a positive sequence component and a negative sequence component so that the errors Δid and Δiq from the subtractors 96 in FIG. 8 described in embodiment 1 become zero. That is, the voltage command values vd* and vq* including both a positive sequence component and a negative sequence component are calculated so that the reactive current id and the active current iq follow the current command values idpn* and iqpn*.

Steady-state deviations Δdid and Δdiq outputted from the comparators 201 include positive sequence components and negative sequence components, and are controlled by the integrators 202 and 206, respectively. As for the negative sequence component, output of each comparator 201 is subjected to coordinate conversion into a negative sequence coordinate system by the two-phase/two-phase coordinate conversion unit 204, and then the negative sequence component is extracted by the filter 205. The extracted negative sequence component is controlled by the integrator 206, and the output therefrom is subjected to coordinate conversion into a positive sequence coordinate system by the two-phase/two-phase coordinate conversion unit 207. The calculation result is added to output of the integrator 202 by the adder 208, whereby the negative sequence component is also controlled.

In the electric power conversion device of the present embodiment 2, by providing the integrators 206 for controlling negative sequence components in the controller 297 in the output current control unit, it becomes possible to control the negative sequence currents in accordance with command values, as well as providing the effect of the electric power conversion device in embodiment 1.

As described above, the electric power conversion device in embodiment 2 has a configuration in which a function unit for controlling a negative sequence current is added to the output current control unit of the electric power conversion device in embodiment 1. Thus, when the grid is unbalanced, increase in unit cell current relative to a steady state is suppressed, and therefore the rated current of the power conversion unit can be reduced and the electric power conversion device can be downsized. Further, it becomes possible to control negative sequence current in accordance with a command value.

Embodiment 3

An electric power conversion device in embodiment 3 has a configuration in which a positive sequence current control unit and a negative sequence current control unit are provided in the output current control unit.

Hereinafter, the configuration and operation of a reference voltage calculation unit in the output current control unit of the electric power conversion device in embodiment 3 will be described on the basis of FIG. 13 which is a configuration diagram of a reference voltage calculation unit 391, focusing on a difference from embodiment 1.

The entire configuration of the electric power conversion device in embodiment 3 is the same as that of the electric power conversion device 1 in embodiment 1. The configuration of the reference voltage calculation unit 391 in the output current control unit is different, and for the purpose of discrimination from the reference voltage calculation unit 91 in embodiment 1, the reference voltage calculation unit is denoted by 391 in FIG. 13.

The output current control unit in embodiment 3 is different from the output current control unit in embodiment 1 only in the configuration and function of the reference voltage calculation unit 391. The other configuration is the same as in embodiment 1, and therefore the description thereof is omitted.

Figure 13:
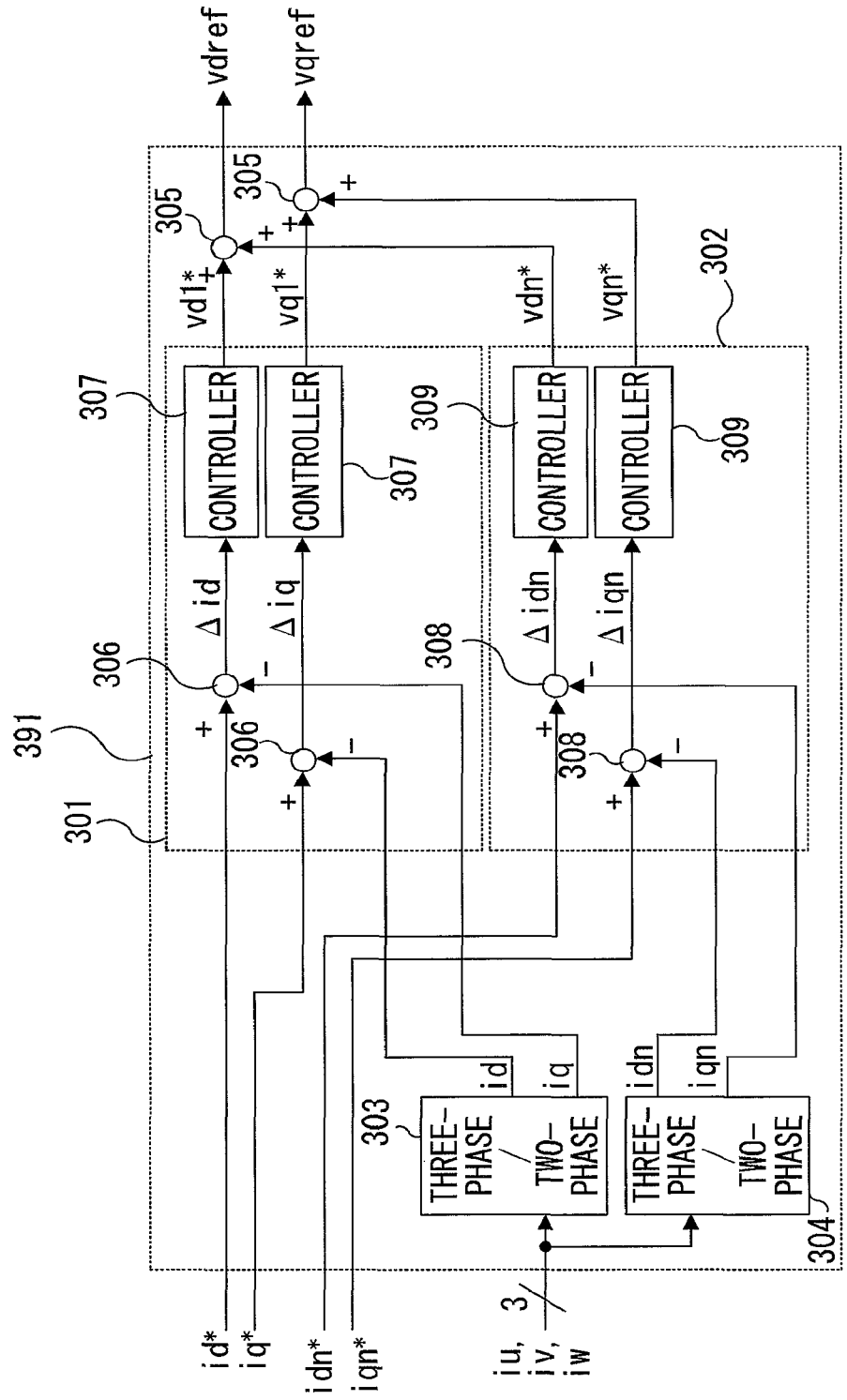
FIG. 13 is a block diagram showing the configuration of a reference voltage calculation unit in an output current control unit of an electric power conversion device according to embodiment 3 of the present invention.

In FIG. 13, the reference voltage calculation unit 391 is composed of a positive sequence current control unit 301, a negative sequence current control unit 302, three-phase/two-phase coordinate conversion units 303 and 304, and adders 305.

The positive sequence current control unit 301 is composed of subtractors 306 and controllers 307, and the negative sequence current control unit 302 is composed of subtractors 308 and controllers 309.

The positive sequence current control unit 301 calculates errors Δid and Δiq between the positive sequence current command values id* and iq* and the positive sequence reactive current id and the positive sequence active current iq, by the subtractors 306. Further, the controllers 307 calculate the positive sequence active/reactive voltage command values vd1* and vq1* so that the calculated errors Δid and Δiq become zero, that is, the positive sequence reactive current id and the positive sequence active current iq follow the positive sequence current command values id* and iq*.

The negative sequence current control unit 302 calculates errors Δidn and Δiqn between the negative sequence current command values idn* and iqn* and the negative sequence reactive current idn and the negative sequence active current iqn, by the subtractors 308. Further, the controllers 309 calculate negative sequence active/reactive voltage command values vdn* and vqn* so that the calculated errors Δidn and Δiqn become zero, that is, the negative sequence reactive current idn and the negative sequence active current iqn follow negative sequence current command values idn* and iqn*.

The three-phase/two-phase coordinate conversion unit 303 performs three-phase to two-phase conversion of the output currents iu, iv, iw in a positive sequence coordinate system, thereby calculating the positive sequence reactive current id and the positive sequence active current iq. The three-phase/two-phase coordinate conversion unit 304 performs three-phase to two-phase conversion of the output currents iu, iv, iw in a negative sequence coordinate system, thereby calculating the negative sequence reactive current idn and the negative sequence active current iqn.

The adders 305 add the negative sequence active/reactive voltage command values vdn* and vqn* outputted from the negative sequence current control unit 302, to the positive sequence active/reactive voltage command values vd1* and vq1* outputted from the positive sequence current control unit 301, thereby calculating the positive-negative sequence reference voltages vdref and vqref.

That is, in the output current control unit in embodiment 3, the positive sequence reactive current id, the positive sequence active current iq, the negative sequence reactive current idn, and the negative sequence active current iqn are individually controlled on four axes.

In the electric power conversion device of the present embodiment 3, by providing the negative sequence current control unit in the output current control unit, it becomes possible to control negative sequence current in accordance with a command value, as well as providing the effect of the electric power conversion device in embodiment 1.

As described above, the electric power conversion device in embodiment 3 has a configuration in which the positive sequence current control unit and the negative sequence current control unit are provided in the output current control unit. Thus, when the grid is unbalanced, increase in unit cell current relative to a steady state is suppressed, and therefore the rated current of the power conversion unit can be reduced and the electric power conversion device can be downsized. Further, it becomes possible to control negative sequence current in accordance with a command value.

Embodiment 4

An electric power conversion device in embodiment 4 is provided with a mechanism for detecting arm output voltage.

Hereinafter, the configuration and operation of the electric power conversion device in embodiment 4 will be described on the basis of FIG. 14 which is the entire configuration diagram of the electric power conversion device, focusing on a difference from embodiment 1.

Figure 14:
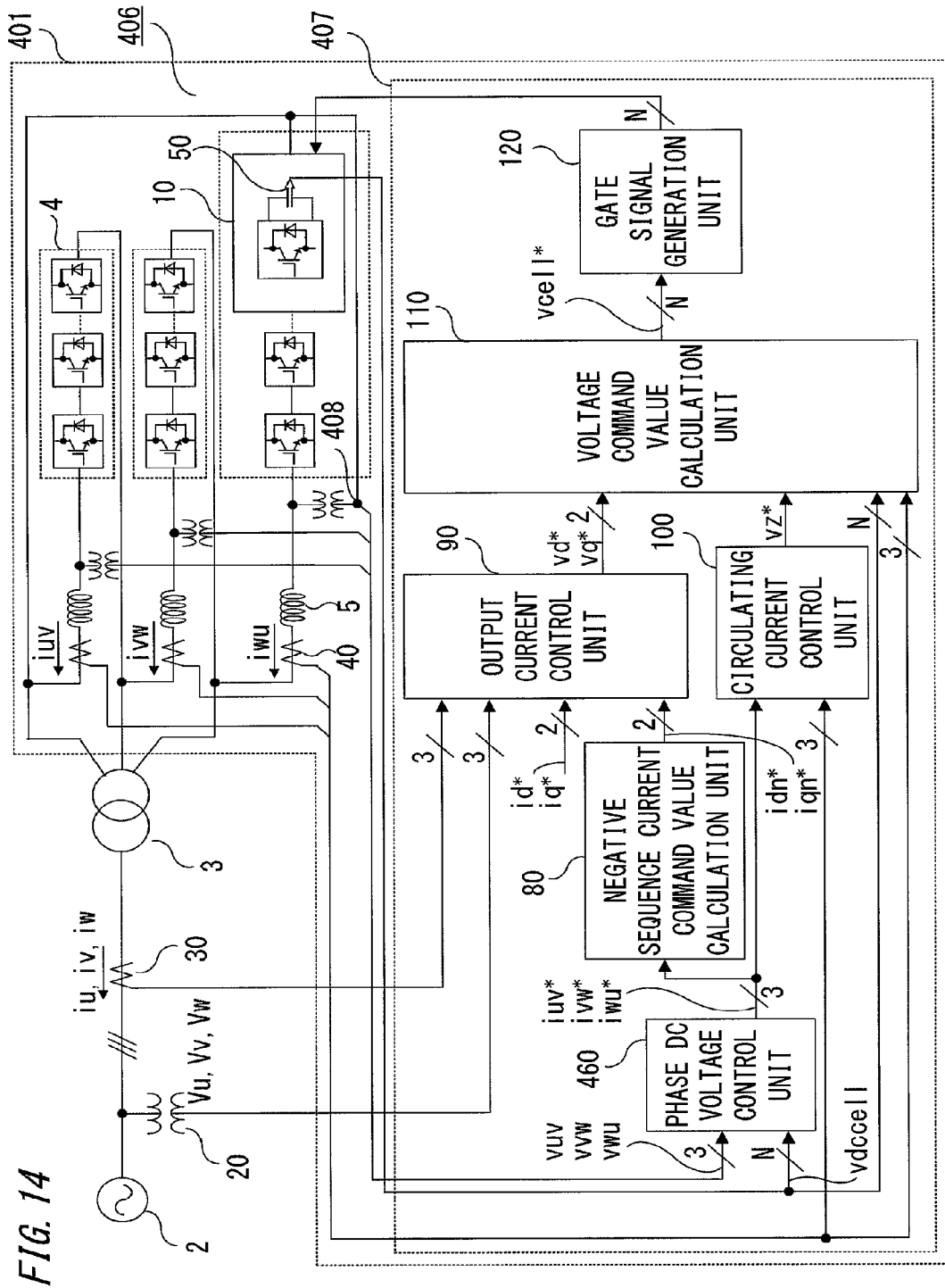
FIG. 14 is an entire configuration diagram of an electric power conversion device according to embodiment 4 of the present invention.

In FIG. 14, the components that are the same as or correspond to those in FIG. 1 are denoted by the same reference characters.

The entire configuration of the electric power conversion device in embodiment 4 is the same as that of the electric power conversion device 1 in embodiment 1 except that an arm output voltage detection unit 408 for detecting arm output voltage is provided. For the purpose of discrimination from the electric power conversion device 1 in embodiment 1, in FIG. 14, the electric power conversion device, the power conversion unit, the converter control unit, and the phase DC voltage control unit are denoted by 401, 406, 407, and 460, respectively.

The electric power conversion device in embodiment 4 is different from the electric power conversion device in embodiment 1 only in that the arm output voltage detection unit 408 for detecting arm output voltage is provided. The other configuration is the same as in embodiment 1, and therefore the description thereof is omitted.

In FIG. 14, the arm output voltage detection unit 408 detects arm output voltages. In the phase DC voltage control unit 460, the multipliers 65 multiply the outputs of the controllers 64 in FIG. 5 described in embodiment 1 by the detected arm output voltages, thereby calculating the arm current command values iuv*, ivw*, iwu*. That is, the phase DC voltage control unit 460 uses arm output voltages detected by the arm output voltage detection unit 408, instead of calculating the estimated converter voltages varmuv, varmvw, varmwu by the estimated converter voltage calculation unit 62 in FIG. 5.

Thus, in the electric power conversion device of embodiment 4 of the present invention, by using the actual arm output voltages as the estimated converter voltages varmuv, varmvw, varmwu, the accuracy of the voltage control is further improved, in addition to the effect in the above embodiment 1.

As described above, the electric power conversion device in embodiment 4 is provided with a mechanism for detecting arm output voltage. Thus, when the grid is unbalanced, increase in unit cell current relative to a steady state is suppressed, and therefore the rated current of the power conversion unit can be reduced and the electric power conversion device can be downsized. Further, the accuracy of the voltage control is improved.

Embodiment 5

An electric power conversion device in embodiment 5 is configured to consider voltage drop from the transformer to the cell output end when the phase DC voltage control unit calculates the estimated value of each arm output voltage.

Hereinafter, the configuration and operation of an estimated converter voltage calculation unit in a phase DC voltage control unit of the electric power conversion device in embodiment 5 will be described on the basis of FIG. 15 which is a block diagram showing the configuration of an estimated converter voltage calculation unit 562, focusing on a difference from embodiments 1 and 4.

The entire configuration of the electric power conversion device in embodiment 5 is the same as that of the electric power conversion device 1 in embodiment 1. In embodiment 5, a specific configuration example of the estimated converter voltage calculation unit is shown, and for the purpose of discrimination from the estimated converter voltage calculation unit 62 in embodiment 1, in FIG. 15, the estimated converter voltage calculation unit is denoted by 562.

Since embodiment 5 shows a specific configuration example of the estimated converter voltage calculation unit, the configuration and function of the estimated converter voltage calculation unit 562 will be described.

Figure 15:
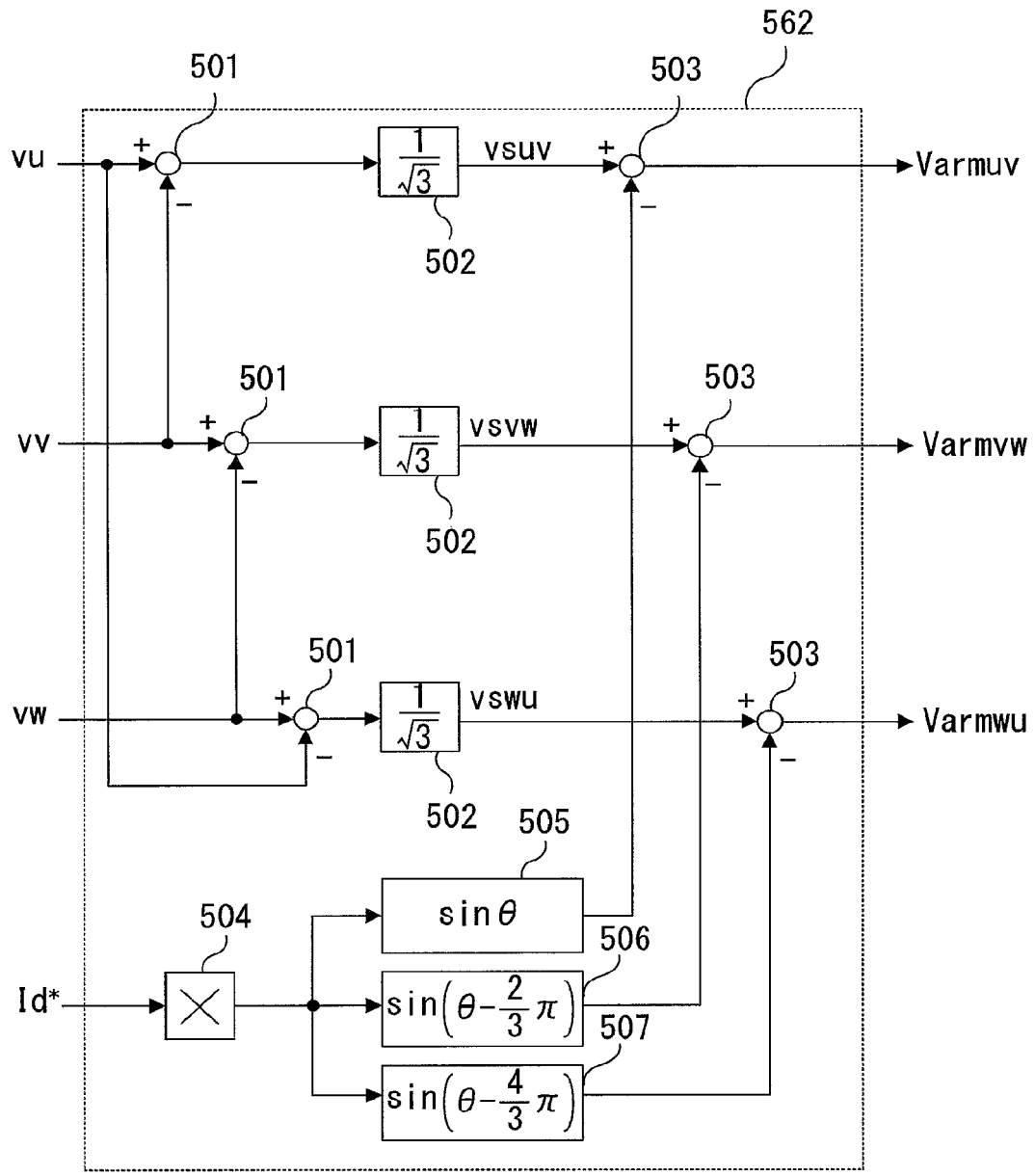
FIG. 15 is a block diagram showing the configuration of an estimated converter voltage calculation unit of an electric power conversion device according to embodiment 5 of the present invention.

In FIG. 15, the estimated converter voltage calculation unit 562 is composed of subtractors 501 and 503, multipliers 502 and 504, and calculators 505, 506, and 507.

From the grid voltages vu, vv, vw, the subtractors 501 calculate voltage differences among the grid voltages, and the multipliers 502 multiply the voltage differences by $1/\sqrt{3}$, thereby calculating grid line-to-line voltages vsuv, vsvw, vswu.

The multiplier 504 multiplies the positive sequence reactive current command value id* by a reactance X of the transformer 3, thereby calculating a voltage drop. The calculators 505, 506, and 507 reflect phase differences ($\frac{2}{3}\pi$, $\frac{4}{3}\pi$) relative to a reference phase θ, in the voltage drop, and the subtractors 503 subtract the resultant values from the grid line-to-line voltages vsuv, vsvw, vswu. As a result, the estimated converter voltages varmuv, varmvw, varmwu are calculated.

In the electric power conversion device in embodiment 5 of the present invention, by considering a voltage drop from the grid voltage in calculation of the estimated converter voltages varmuv, varmvw, varmwu, it becomes unnecessary to provide a mechanism for detecting arm output voltage, in addition to the effect of improving the accuracy of voltage control in the electric power conversion device in embodiment 4.

As described above, the electric power conversion device in embodiment 5 is configured to consider voltage drop of the transformer when the phase DC voltage control unit calculates the estimated value of each arm output voltage. Thus, when the grid is unbalanced, increase in unit cell current relative to a steady state is suppressed, and therefore the rated current of the power conversion unit can be reduced and the electric power conversion device can be downsized. Further, the accuracy of the voltage control is improved, and a mechanism for detecting arm output voltage is not needed, leading to simplification of the facility.

Embodiment 6

The electric power conversion device in embodiment 6 has a configuration in which a single-phase detection function unit is provided in the estimated converter voltage calculation unit in the phase DC voltage control unit.

Hereinafter, the configuration and operation of the estimated converter voltage calculation unit in the phase DC voltage control unit of the electric power conversion device in embodiment 6 will be described on the basis of FIG. 16 which is a block diagram showing the configuration of an estimated converter voltage calculation unit 662, focusing on a difference from embodiment 5.

The entire configuration of the electric power conversion device in embodiment 6 is the same as that of the electric power conversion device 1 in embodiment 1. In embodiment 6, another specific configuration example of the estimated converter voltage calculation unit is shown, and for the purpose of discrimination from the estimated converter voltage calculation unit 562 in embodiment 5, in FIG. 16, the estimated converter voltage calculation unit is denoted by 662.

Since embodiment 6 shows another specific configuration example of the estimated converter voltage calculation unit, the configuration and function of the estimated converter voltage calculation unit 662 will be described.

Figure 16:
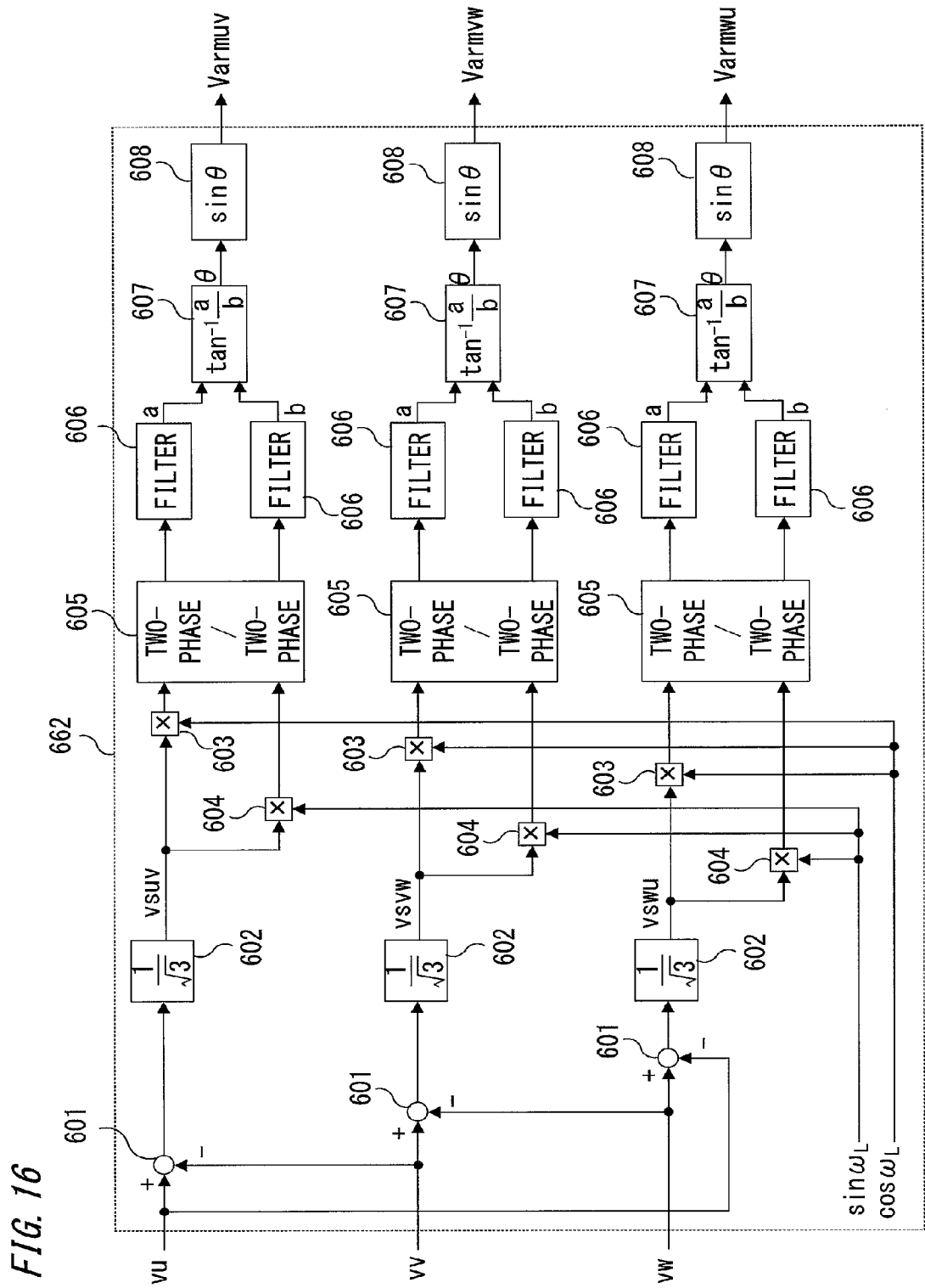
FIG. 16 is a block diagram showing the configuration of an estimated converter voltage calculation unit of an electric power conversion device according to embodiment 6 of the present invention.

In FIG. 16, the estimated converter voltage calculation unit 662 is composed of subtractors 601, multipliers 602, 603, and 604, two-phase/two-phase coordinate conversion units 605, filters 606, and calculators 607 and 608.

From the grid voltages vu, vv, vw, the subtractors 601 calculate voltage differences among the grid voltages, and the multipliers 602 multiply the voltage differences by $1/\sqrt{3}$, thereby calculating the grid line-to-line voltages vsuv, vsvw, vswu.

The multipliers 603 and 604 multiply the grid line-to-line voltages vsuv, vsvw, vswu by $\sin \omega_L$ and $\cos \omega_L$ (here, θ is a reference phase, $\omega_L = \theta + \pi/6$), whereby signals having phases different by 90 degrees from the grid line-to-line voltages vsuv, vsvw, vswu are calculated using the reference phase. The two-phase/two-phase coordinate conversion units 605 perform, for the output signals from the multipliers 603 and 604, rotating coordinate conversion from a positive sequence coordinate system. Thereafter, through filtering by the filters 606, single-phase voltage vectors that do not include harmonics are detected. The calculators 607 calculate the phase θ from the voltage vectors, and then the calculators 608 calculate the estimated converter voltages varmuv, varmvw, varmwu.

In the electric power conversion device in embodiment 6 of the present invention, a single-phase detection function is provided in the estimated converter voltage calculation unit, single-phase voltage vectors that do not include harmonics are detected, and the estimated converter voltages varmuv, varmvw, varmwu are calculated on the basis of the single-phase voltage vectors. Thus, the synchronization accuracy of the phase of reference voltage is improved, and the arm current maximum value in the case of imbalance can be reduced.

As described above, the electric power conversion device in embodiment 6 has a configuration in which the single-phase detection function is provided in the estimated converter voltage calculation unit in the phase DC voltage control unit. Thus, when the grid is unbalanced, increase in unit cell current relative to a steady state is suppressed, and therefore the rated current of the power conversion unit can be reduced and the electric power conversion device can be downsized. Further, the conversion efficiency can be improved, and energy saving can be achieved. Further, the arm current maximum value in the case of imbalance can be reduced.

It is noted that, within the scope of the present invention, the above embodiments may be freely combined with each other, or each of the above embodiments may be modified or abbreviated as appropriate.

INDUSTRIAL APPLICABILITY

The present invention relates to an electric power conversion device that enables reduction in current flowing in a power conversion unit when a grid is unbalanced, and is applicable to a wide range of large-power conversion devices.

The invention claimed is:

1. An electric power conversion device comprising:
   a power conversion unit connected to a three-phase AC circuit; and
   a converter control unit for controlling the power conversion unit, wherein
   the power conversion unit includes three arms connected to the AC circuit and connected in a delta-connection manner,
   each arm has one or a plurality of unit cells connected in cascade, to which a reactor is connected in series,
   each unit cell includes a series unit of a plurality of semiconductor switches connected in series to each other, and a DC capacitor connected in parallel to the series unit,
   the converter control unit includes:
      a phase DC voltage control unit for calculating phase arm current command values on the basis of DC capacitor voltages of the cells;
      a negative sequence current command value calculation unit for calculating a negative sequence current command value on the basis of the phase arm current command values;
      an output current control unit for, on the basis of the negative sequence current command value and a predetermined positive sequence current command value, calculating a voltage command value including both a positive sequence component and a negative sequence component, for controlling output current of the power conversion unit;
      a circulating current control unit for, on the basis of the phase arm current command values, calculating a zero sequence voltage command value for controlling circulating current;
      a voltage command value calculation unit for calculating an output voltage command value for each unit cell on the basis of the voltage command value including both the positive sequence component and the negative sequence component, the zero sequence voltage command value, the cell DC capacitor voltages, and the phase arm currents; and
      a gate signal generation unit for calculating a gate signal for controlling each semiconductor switch in the unit cell on the basis of the output voltage command value, and
   imbalance of the cell DC capacitor voltages among phases due to grid imbalance is controlled by the circulating current and the negative sequence current.

2. The electric power conversion device according to claim 1, wherein
   the positive sequence current command value is composed of a positive sequence active current command value and a positive sequence reactive current command value,
   the electric power conversion device further comprising an overall voltage control unit for calculating the positive sequence active current command value so that error between the output voltage command value and a representative value of the cell DC capacitor voltages becomes zero.

3. The electric power conversion device according to claim 2, wherein
   the positive sequence reactive current command value is calculated from positive sequence voltage of the AC circuit.

4. The electric power conversion device according to claim 2, wherein
   a superior control system calculates the positive sequence reactive current command value from voltage of a grid power supply, and the calculated positive sequence reactive current command value is received and used.

5. The electric power conversion device according to claim 2, wherein
   the phase DC voltage control unit calculates the phase arm current command values by using detected voltages of output voltages of the arms.

6. The electric power conversion device according to claim 2, wherein
   the phase DC voltage control unit corrects grid voltage of the AC circuit by impedance drop voltage to a cell output end from a transformer via which the AC circuit and the power conversion unit are connected, thereby calculating an estimated value of output voltage of each arm, and by using a result of the calculation, calculates the phase arm current command values.

7. The electric power conversion device according to claim 2, wherein
   the phase DC voltage control unit
      calculates grid line-to-line voltages from grid voltage of the AC circuit,
      by using a reference phase, calculates single-phase voltage vectors that are different by 90 degrees from the respective grid line-to-line voltages and do not include harmonic components, calculates estimated values of output voltages of the arms on the basis of the single-phase voltage vectors, and by using a result of the calculation, calculates the phase arm current command values.

8. The electric power conversion device according to claim 1, wherein the positive sequence current command value is composed of a positive sequence active current command value and a positive sequence reactive current command value, and the positive sequence active current command value is set on the basis of loss in the electric power conversion device.

9. The electric power conversion device according to claim 1, wherein the negative sequence current command value calculation unit removes a positive sequence component and a zero sequence component from each phase arm current command value, thereby calculating the negative sequence current command value.

10. The electric power conversion device according to claim 9, wherein the output current control unit causes the output current to follow an output current command value calculated by summing the positive sequence current command value and the negative sequence current command value.

11. The electric power conversion device according to claim 9, wherein the output current control unit includes: a positive sequence current control unit for causing a positive sequence component of the output current to follow the positive sequence current command value; and a negative sequence current control unit for causing a negative sequence current component of the output current to follow the negative sequence current command value.

12. The electric power conversion device according to claim 9, wherein the phase DC voltage control unit calculates the phase arm current command values by using detected voltages of output voltages of the arms.

13. The electric power conversion device according to claim 9, wherein the phase DC voltage control unit corrects grid voltage of the AC circuit by impedance drop voltage to a cell output end from a transformer via which the AC circuit and the power conversion unit are connected, thereby calculating an estimated value of output voltage of each arm, and by using a result of the calculation, calculates the phase arm current command values.

14. The electric power conversion device according to claim 9, wherein the phase DC voltage control unit calculates grid line-to-line voltages from grid voltage of the AC circuit, by using a reference phase, calculates single-phase voltage vectors that are different by 90 degrees from the respective grid line-to-line voltages and do not include harmonic components, calculates estimated values of output voltages of the arms on the basis of the single-phase voltage vectors, and by using a result of the calculation, calculates the phase arm current command values.

15. The electric power conversion device according to claim 1, wherein the output current control unit causes the output current to follow an output current command value calculated by summing the positive sequence current command value and the negative sequence current command value.

16. The electric power conversion device according to claim 15, wherein the output current control unit calculates a steady-state deviation from the output current command value and the output current, performs coordinate conversion of the steady-state deviation to extract a negative sequence component, and controls the negative sequence component.

17. The electric power conversion device according to claim 1, wherein the output current control unit includes: a positive sequence current control unit for causing a positive sequence component of the output current to follow the positive sequence current command value; and a negative sequence current control unit for causing a negative sequence current component of the output current to follow the negative sequence current command value.

18. The electric power conversion device according to claim 1, wherein the phase DC voltage control unit calculates the phase arm current command values by using detected voltages of output voltages of the arms.

19. The electric power conversion device according to claim 1, wherein the phase DC voltage control unit corrects grid voltage of the AC circuit by impedance drop voltage to a cell output end from a transformer via which the AC circuit and the power conversion unit are connected, thereby calculating an estimated value of output voltage of each arm, and by using a result of the calculation, calculates the phase arm current command values.

20. The electric power conversion device according to claim 1, wherein the phase DC voltage control unit calculates grid line-to-line voltages from grid voltage of the AC circuit, by using a reference phase, calculates single-phase voltage vectors that are different by 90 degrees from the respective grid line-to-line voltages and do not include harmonic components, calculates estimated values of output voltages of the arms on the basis of the single-phase voltage vectors, and by using a result of the calculation, calculates the phase arm current command values.

* * * * *